(12) United States Patent
Naidoo et al.

(10) Patent No.: US 10,616,419 B1
(45) Date of Patent: Apr. 7, 2020

(54) DEVICES, SYSTEMS AND METHODS FOR COMMUNICATIONS THAT INCLUDE SOCIAL MEDIA CLIENTS

(71) Applicant: Mitel Networks ULC, Ottawa (CA)

(72) Inventors: Logendra Naidoo, Ottawa (CA); Ralph Anzarouth, Ottawa (CA); Thomas A Gray, Mansfield (CA)

(73) Assignee: Mitel Networks Corporation, Ottawa, Ontario (CA)

(*) Notice: Subject to any disclaimer, the term of this patent is extended or adjusted under 35 U.S.C. 154(b) by 0 days.

(21) Appl. No.: 16/217,363

(22) Filed: Dec. 12, 2018

(51) Int. Cl.
*H04L 29/06* (2006.01)
*H04M 7/12* (2006.01)
*H04M 7/00* (2006.01)

(52) U.S. Cl.
CPC ......... *H04M 7/128* (2013.01); *H04M 7/0075* (2013.01); *H04M 7/1285* (2013.01)

(58) Field of Classification Search
CPC ........ G06F 3/0484; G06F 17/28; G06F 17/30; G06F 21/62; G06Q 30/02; H03M 3/42; H03M 3/56; H04L 29/06; H04L 29/08; H04L 12/66; H04L 29/12; H04M 7/0075; H04M 7/128; H04M 7/1285; H04W 4/00; H04W 8/28
USPC ...................... 348/14.08; 370/352, 310, 356; 379/88.17, 93.02, 216.01, 142.04, 221.13; 704/275; 705/14.64; 709/204, 206, 234; 715/707, 708, 757
See application file for complete search history.

(56) References Cited

U.S. PATENT DOCUMENTS

| | | | | |
|---|---|---|---|---|
| 8,184,798 B2* | 5/2012 | Wiatrowski | ........ | H04L 29/1216 370/352 |
| 8,244,905 B2* | 8/2012 | Bhatt | ..................... | H04L 45/306 709/234 |
| 8,537,993 B2* | 9/2013 | Dwight | ............... | H04L 29/1216 379/142.04 |
| 8,638,780 B1* | 1/2014 | Zhang | ................. | H04L 12/6418 370/352 |
| 8,879,442 B2* | 11/2014 | Ku | ...................... | H04L 29/1216 370/310 |
| 9,071,468 B2* | 6/2015 | Forsyth | ............... | H04M 7/0075 |
| 9,124,603 B2* | 9/2015 | Jackson | ............ | H04L 29/12896 |
| 9,237,173 B2* | 1/2016 | Ku | ........................... | H04L 12/66 |
| 9,270,818 B1* | 2/2016 | Nelissen | ............... | H04W 4/023 |
| 10,326,886 B1* | 6/2019 | John Chuan | ........ | H04L 65/1046 |
| 2007/0165613 A1* | 7/2007 | Soo | ................... | H04L 29/06027 370/356 |

(Continued)

*Primary Examiner* — Gerald Gauthier

(57) ABSTRACT

Devices, systems and methods for communications that include social media clients are provided. In particular, a server operates a virtual client for communicating with clients of a social media server. The server receives a call request associated with a directory number of a call server, the call request to initiate a call associated with the directory number and a given client of the social media server. The server conducts the call by controlling: the virtual client to communicate with the given client, via the social media server; and the virtual client to communicate with a communication device associated with the directory number, via the call server. The server may also facilitate exchange of status updates between a given client of the social media server and the call server. The server may also facilitate calls between respective clients of different social media servers.

6 Claims, 9 Drawing Sheets

(56) References Cited

U.S. PATENT DOCUMENTS

| | | | | |
|---|---|---|---|---|
| 2010/0157977 A1* | 6/2010 | Ku | H04L 29/1216 | 370/352 |
| 2010/0322402 A1* | 12/2010 | Ramanathan | H04M 3/42059 | 379/211.01 |
| 2011/0047229 A1* | 2/2011 | Sinha | G06F 9/543 | 709/206 |
| 2011/0182283 A1* | 7/2011 | Van Buren | H04M 3/4936 | 370/352 |
| 2011/0225518 A1* | 9/2011 | Goldman | G06F 3/04815 | 715/757 |
| 2012/0087367 A1* | 4/2012 | Anikin | H04W 4/21 | 370/352 |
| 2012/0300768 A1* | 11/2012 | Huang | H04L 61/157 | 370/352 |
| 2012/0311045 A1* | 12/2012 | Sylvain | H04L 51/12 | 709/206 |
| 2013/0156174 A1* | 6/2013 | Kuo | H04M 11/08 | 379/93.02 |
| 2013/0163742 A1* | 6/2013 | Lim | H04M 3/44 | 379/216.01 |
| 2013/0290433 A1* | 10/2013 | Park | G06Q 30/02 | 709/204 |
| 2014/0244266 A1* | 8/2014 | Brown | G06F 9/453 | 704/275 |
| 2014/0245140 A1* | 8/2014 | Brown | G06Q 10/06 | 715/708 |
| 2014/0351351 A1* | 11/2014 | Yu | H04L 51/20 | 709/206 |
| 2015/0121216 A1* | 4/2015 | Brown | G06N 3/006 | 715/707 |
| 2015/0373171 A1* | 12/2015 | Marimuthu | H04M 3/493 | 348/14.08 |
| 2016/0055537 A1* | 2/2016 | Tiger | G06Q 30/0267 | 705/14.64 |
| 2016/0248814 A1* | 8/2016 | Mufti | H04L 65/1006 | |
| 2017/0041435 A1* | 2/2017 | Simpson | H04L 43/16 | |
| 2017/0061005 A1* | 3/2017 | Purcell | G06F 16/951 | |
| 2017/0085657 A1* | 3/2017 | Bostick | H04L 67/22 | |
| 2017/0104713 A1* | 4/2017 | Agarwal | G06Q 10/10 | |
| 2017/0104802 A1* | 4/2017 | Chandran | G06Q 50/01 | |
| 2017/0118632 A1* | 4/2017 | Paiement | H04M 3/42348 | |
| 2017/0148036 A1* | 5/2017 | Klemm | G06Q 30/0201 | |
| 2017/0244663 A1* | 8/2017 | Ku | H04L 61/1511 | |
| 2017/0270556 A1* | 9/2017 | Eklund | G06Q 30/0226 | |
| 2018/0018708 A1* | 1/2018 | Locke | G06K 9/00671 | |
| 2018/0075488 A1* | 3/2018 | Celik | H04M 3/42357 | |
| 2018/0136803 A1* | 5/2018 | Parry | G06F 17/276 | |
| 2018/0157647 A1* | 6/2018 | Marwah | G06F 17/289 | |
| 2018/0232530 A1* | 8/2018 | Mak | G06F 21/6218 | |
| 2018/0302462 A1* | 10/2018 | Kwon | H04L 67/06 | |
| 2019/0050911 A1* | 2/2019 | Fuller | G06Q 30/0273 | |

* cited by examiner

US 10,616,419 B1

DEVICES, SYSTEMS AND METHODS FOR COMMUNICATIONS THAT INCLUDE SOCIAL MEDIA CLIENTS

FIELD

The present specification generally relates to server devices, and methods therefore. More particularly, exemplary embodiments of the specification relate to devices, systems, and methods for communications that include social media clients.

BACKGROUND OF THE INVENTION

Communications using internet-based applications (e.g. "apps") and/or social media clients to message a friend and/or place a telephone call (e.g. and avoid cellular charges or costs associated with landlines are becoming ubiquitous. Similar packet-based communication techniques including VoIP (Voice over Internet Protocol) calls may be placed over the internet using clients embedded within a website accessed via a personal computer and/or laptop, and the like. However, internet voice-call users are generally not accessible from within a business communications system such as an enterprise business (or cloud) network application, which may depend on landlines and/or cellular networks. A similar situation may exist for users (such as consumers) who use landlines or cell phones, but who don't have access to social media applications. Yet another similar situation may exist for users (such as consumers) who use social media applications for calling, but who are unable to call landlines or cell phones and/or communication devices services by a local area network, and the like, for example in a business communication system.

BRIEF DESCRIPTION OF THE SEVERAL VIEWS OF THE DRAWINGS

Subject matter of the present specification is particularly pointed out and distinctly claimed in the concluding portion of the specification. A more complete understanding of the present specification, however, may best be obtained by referring to the detailed description and claims when considered in connection with the drawing figures.

Figure 1:
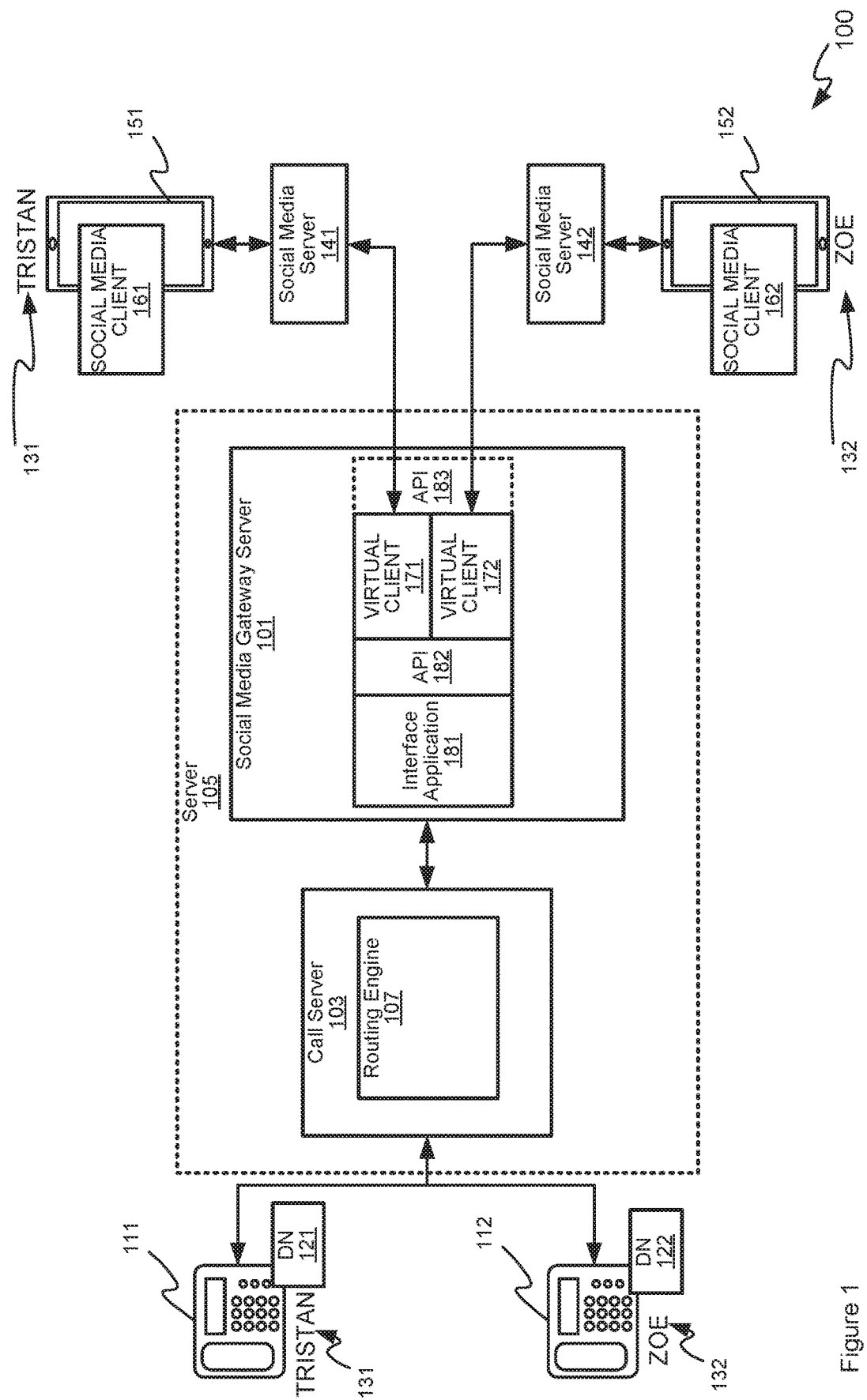
FIG. 1 illustrates a system in accordance with exemplary embodiments of the specification.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present specification.

DETAILED DESCRIPTION OF THE INVENTION

The description of various embodiments of the present specification provided below is merely exemplary and is intended for purposes of illustration only; the following description is not intended to limit the scope of the specification disclosed herein. Moreover, recitation of multiple embodiments having stated features is not intended to exclude other embodiments having additional features or other embodiments incorporating different combinations of the stated features.

The specification describes exemplary devices, systems, and methods. As set forth in more detail below, exemplary devices, systems, and methods described herein may be conveniently used in home or office settings. However, the specification is not limited to such applications An aspect of the specification provides a server comprising: a communication unit configured to communicate with a social media server; and a controller communicatively coupled to the communication unit, the controller configured to: operate a virtual client for communicating with clients of the social media server; receive, via the communication unit, a call request associated with a directory number of a call server, the call request to initiate a call associated with the directory number and a given client of the social media server; and conduct, via the communication unit, the call by controlling: the virtual client to communicate with the given client, via the social media server; and the virtual client to communicate with a communication device associated with the directory number, via the call server.

Another aspect of the specification provides a server comprising: a communication unit configured to communicate with: a first social media server; and a second social media server; a controller communicatively coupled to the communication unit, the controller configured to: operate a first virtual client for communicating with first clients of the first social media server; operate a second virtual client for communicating with second clients of the second social media server; receive, via the communication unit, a call request to initiate a call between a first given client of the first social media server and a second given client of the second social media server; conduct, via the communication unit, the call between the first given client and the second given client by controlling: the first virtual client to communicate with the given first client via the first social media server; the second virtual client to communicate with the given second client via the second social media server; and the first virtual client to communicate with the second virtual client.

Another aspect of the specification provides a server comprising: a communication unit configured to communicate with a social media server; and a controller communicatively coupled to the communication unit, the controller configured to: operate a virtual client for communicating with clients of the social media server; receive, via the communication unit, at the virtual client, social media status information of a given client of the social media server, the given client associated with a given directory number of a call server; and transmit, via the communication unit, to the call server, the social media status information to cause the call server to update a call server status associated with the given directory number based on the social media status information of the given client of the social media server.

FIG. 1 illustrates a system 100 in accordance with exemplary embodiments of the specification. System 100 includes a social media gateway server 101, interchangeably referred to hereafter as the server 101, in communication with a call server 103. In some examples, the social media gateway server 101 and the call server 103 are combined into a single server 105, however the servers 101, 103 may also be separate servers. When combined, the servers 101, 103 may share processing resources and the like.

In general the call server 103 (whether or alone or combined with the server 101) may comprise one or more of a private branch exchange (PBX) server, a call manager server, an internet protocol (IP) based call server (such as a Session Initiation Protocol (SIP)) call server, and the like), a carrier switch and/or any other server and/or device which manages voice calls (and/or video calls) for communication devices. As depicted, the call server 103 comprises a routing engine 107 which manages and/or routes calls for communication devices and provides various functionality for communication devices communicating via the call server 103 including, but not limited to, a call forwarding personal ring groups, cascade ringing, voicemail, and the like.

As depicted, the call server 103 and/or the routing engine 107 may manage and/or route calls for a first communication device III and a second communication device 112. As depicted, the communication devices 111, 112 are each embodied as a desk phone and/or a stationary phone, each of which may be desk phones and/or stationary phones in a business environment. In these examples, the communication devices 111, 112 and the call server 103 may be in communication via a local area network (LAN) (not depicted).

However, in other examples, the first communication device 111 may be a desk phone in a business environment, in communication with the call server 103 via a LAN, while the second communication device 112 may be a stationary phone or a mobile phone external to the business environment, which may communicate with the first communication device 112 via the call server 103 and another communication network external to the LAN, such as the PSTN (public switched telephone network) a cell phone network, and the like.

Indeed, in FIG. 1, and throughout the present specification, connections and/or communication links between components are depicted as a double-ended arrow which may include any suitable combination of wired and/or wireless communication networks.

In general, each of the communication devices 111, 112 are associated with a respective directory number 121, 122, and the like which may include, but is not limited to, an extension in the LAN, a PSTN directory number, a universal resource locator, and the like. Indeed, as depicted the first communication device 111 and/or directory number 121 may be associated with a user 131 "TRISTAN", and the second communication device 112 and/or directory number 112 may be associated with a user 132 "ZOE".

Furthermore while, as depicted, the system 100 comprises two communication devices 111, 112, and only one of the two communication devices 111, 112 may be in communication with the call server 103 via a LAN, in other examples, the system 100 may comprise a plurality of communication devices in communication with the call server 103 via a LAN, for example in a business environment, Hence, for example, the communication device 111 may be managed by the call server 103 via a LAN, while the communication device 112 a device not managed by the call server 103 via a LAN, but that may call the communication device 111 (or vice versa); however, in other examples, both the communication devices 111, 112 may be managed by the call server 103 via a LAN.

As depicted, the server 101 is configured to communicate with a first social media server 141 and a second social media server 142, each of which may provide respective social media services to respective mobile devices 151, 152 via respective social media clients 161, 162. Each of the social media clients 161, 162 are interchangeably referred to hereafter, respectively, as a client 161, 162 and/or a given client 161, 162.

For example, each of the social media servers 141, 142 may maintain thousands and/or millions of social media accounts and/or offer various social media services to thousands and/or millions of devices of which the mobile devices 151, 152 are merely an example. Indeed, while social media services of the social media servers 141, 142 are described with respect to the mobile devices 151, 152, any computing device and/or communication device may access the social media accounts and/or social media services of the social media servers 141, 142 via an installed client and/or via accessing a website via a browser application, the website in the browser application also operating as a social media client.

Furthermore, while each of the social media servers 141, 142 are depicted in FIG. 1 as a single server, each of the social media servers 141, 142 may be embodied as respective social media systems, and may include, but are not limited to, one or more web servers and/or cloud servers offering social media services, web services, caching operations, and the like one or more databases and/or SQL (Structured Query Language) databases (e.g. storing social media account information, and the like), and/or any other suitable computing device and/or memory device used in social media systems. Hence, the term "social media server" as used herein is not meant to be unduly limiting and may include any suitable type and/or combination of device and/or devices used in social media systems.

As depicted, the first mobile device 151 is associated with the user 131 "TRISTAN" and the second mobile device 152 is associated with the user 132 "ZOE". Hence, in the present example, the user 131 may use the first communication device 111 as a desktop phone in a business environment, and the first mobile device 151 for social media services via the social media client 161, for example to access a social media account at the first social media server 141. Similarly, in the present example the user 132 may use the second communication device 112 as a desktop phone in a business environment (or home environment), and the second mobile device 152 for social media services via the social media client 162, for example to access a social media account at the second social media server 142.

In general, the communication devices 111, 112, in prior art systems, previously not able to communicate with the mobile devices 151, 152 via the social media clients 161, 162. However, as will be described below the server 101 (and/or the server 105) is generally provided to facilitate communications between the communication devices 111, 112 and the mobile devices 151, 152 via the social media clients 161, 162.

While the social media services of the social media servers 141, 142 may include posting photos, status updates, and the like, at associated social media accounts, in the present example, the social media services of the social media servers 141, 142 include voice calls (and which may further include, but are not limited to, video calls).

Hence, for example, two devices that operate respective social media clients of the first social media server 141 may communicate using voice calls via the respective social media clients 161 and the first social media server 141. Similarly two devices that operate respective social media clients of the second social media server 142 may communicate using voice calls via the respective social media clients and the second social media server 142.

However, in general, when the social media servers 141, 142 are not themselves associated (e.g. the social media servers 141, 142 are operated by different social media entities and/or offer social media servers only to devices operating respective social media clients 161, 162), devices that operate a social media client of the first social media server 141, but not a social media client of the second social media server 142, may not communicate with devices that operate a social media client of the second social media server 142, but not a social media client of the first social media server 141.

Hence, for example, the mobile devices 151, 152, in prior art systems, were previously not able to communicate with each other via the social media clients 161, 162. However, as will be described below the server 101 (and/or the server 105) is generally provided to facilitate communications between the mobile devices 151, 152 via the social media clients 161, 162.

In particular, the server 101 is generally configured to operate a virtual client 171 for communicating with clients of the first social media server 141, such as the social media client 161. The virtual client 171 is generally also a social media client of the first social media server 141 but operated by the server 101. Hence, the virtual client 171 and the social media client 161 may generally communicate via the first social media server 141, and such communications may generally include voice calls.

Similarly, as depicted, the server 101 is generally configured to operate a virtual client 172 for communicating with clients of the second social media server 142, such as the social media client 162. The virtual client 172 is generally also a social media client of the second social media server 142 but operated by the server 101. Hence, the virtual client 172 and the social media client 162 may generally communicate via the second social media server 142, and such communications may generally include voice calls.

In some examples, the server 101 may be configured to connect and/or facilitate calls between the communication devices 111, 112 and the social media clients 161, 162 via the virtual clients 171, 172.

For example, as depicted, the server 101 may operate an interface application 181 for translating communications between the virtual clients 171, 172 and the call server 103, the call server 103 and the virtual clients 171, 172 communicating with each other via the interface application 181. In particular, the virtual clients 171, 172 and/or the interface application 181 may include at least one application programming interface (API) 182 used to interface with the virtual clients 171, 172. While only one interface application 181 and one API 182 is depicted, the server 101 may operate a respective interface application and API for each of the virtual clients 171, 172. Indeed, a respective API 182 may further be integrated with each of the virtual clients 171, 172.

In yet further examples, as described in more detail below, status updates that occur at the social media clients 161, 162 may be transmitted to the call server 103 via the virtual clients 171, 172 to update a call server status for a respective communication device 111, 112, and vice versa.

Furthermore, as described in detail below, the server 101 may be configured to connect and/or facilitate calls between the social media clients 161, 162 via the virtual clients 171, 172. For example, as depicted, As depicted, the server 101 may further operate an optional API 183 used to interface between the virtual clients 171, 172 and the respective servers 141, 142 and/or the API 183 may be further configured to translate communications between the virtual clients 171, 172. In some examples, the server 101 may operate a respective API 183 for each of the virtual clients 171, 172 (and/or for each type of virtual client 171, 172). In yet further examples, a respective API 183 may be integrated with each of the virtual clients 171, 172. In some examples, the API 183 may be "authorized" by an entity operating the social media servers 141, 142, while in other examples, may not be "authorized" by an entity operating the social media servers 141, 142.

While as depicted the server 101 is configured to communicate with two social media servers 141, 142 and respective social media clients 161, 162, in other examples the server 101 may be configured to communicate with as few as one social media server, such as the first social media server 141, and respective social media clients 161 of the one social media server 141. For example, the server 101 may connect and/or facilitate calls between the communication devices 111, 112 and the social media client 161 via the virtual client 171 and the first social media server 141.

However, in other examples, the server 101 may be configured to communicate with more than two social media servers, and operate virtual clients for each of the more than two social media servers. In these examples, the server 101 may be configured to connect and/or facilitate calls between the communication devices 111, 112 and the social media clients of the more than two social media servers via respective virtual clients. Furthermore, in these examples, the server 101 may be configured to connect and/or facilitate calls between the social media clients of the more than two social media servers and respective virtual clients.

Furthermore, while as depicted, the server 101 operates one respective virtual client 171, 172 for communicating with the social media clients 161, 162 of each of the social media servers 141, 142, in other examples the server 101 may operate a plurality of virtual clients 171 for communicating with the social media clients 161 of the first social media server 141 and/or the server 101 may operate a plurality of virtual clients 172 for communicating with the social media clients 162 of the second social media server 142.

Figure 9:
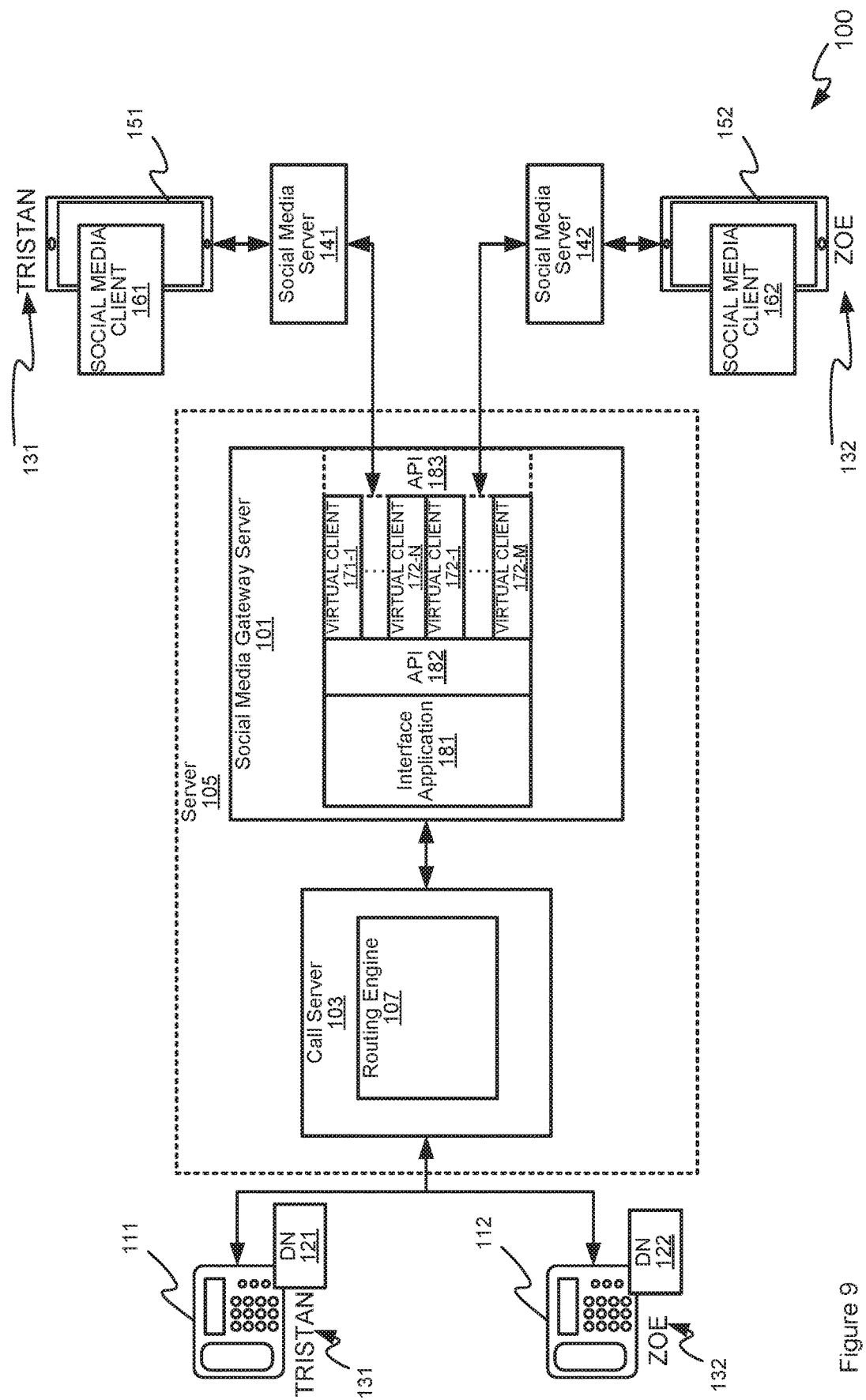
FIG. 9 illustrates the system of FIG. 1 with a plurality of virtual clients in accordance with exemplary embodiments of the specification.

For example, attention is briefly directed to FIG. 9, Which is substantially, similar to FIG. 1, with like components having like numbers, and which depicts the system 100 with the server 101 operating "N" number of virtual clients 171 (e.g. virtual client 171-1 . . . 171-N) and the server 101 operating "M" number of virtual clients 172 (e.g. virtual client 171-2 . . . 172-M). The number "N" of virtual clients 171 and/or the number "M" of virtual clients 172 may vary. Alternatively, the numbers "N" and "M" may be the same and correspond to a number of plurality of communication devices (e.g. including at least the communication device 111) in communication with the call server 103 via a LAN. However, the number "N" of virtual clients 171 may correspond to a number of communication devices in communication with the call server 103 associated with corresponding social media clients 161, and the number "M" of virtual clients 172 may correspond to a number of communication devices in communication with the call server 103 associated with corresponding social media clients 162.

For example, returning to FIG. 1, the server 101 may operate a respective virtual client 171, 172 for each of a plurality of communication devices in communication with the call server 103 via a LAN such that each of the plurality of communication devices in communication with the call server 103 via a LAN has a dedicated virtual client 171 for communicating with social media clients 161 of the first social media server 141 and/or such that each of the plurality of communication devices in communication with the call server 103 via a LAN has a dedicated virtual client 172 for communicating with social media clients 162 of the second social media server 142.

However, in other examples, virtual clients 171, 172 at the server 101 may not be dedicated to communication devices in communication with the call server 103 via a LAN; rather, in these examples, the virtual clients 171, 172 at the server 101 may be temporarily associated with communication devices in communication with the call server 103 via a LAN on an as-needed basis.

Regardless, the respective virtual client 171, 172 may be further used to access social media accounts at the respective social media servers 141, 142 and/or respective virtual client 171, 172 may be associated with respective social media accounts at the respective social media servers 141, 142.

Figure 2:
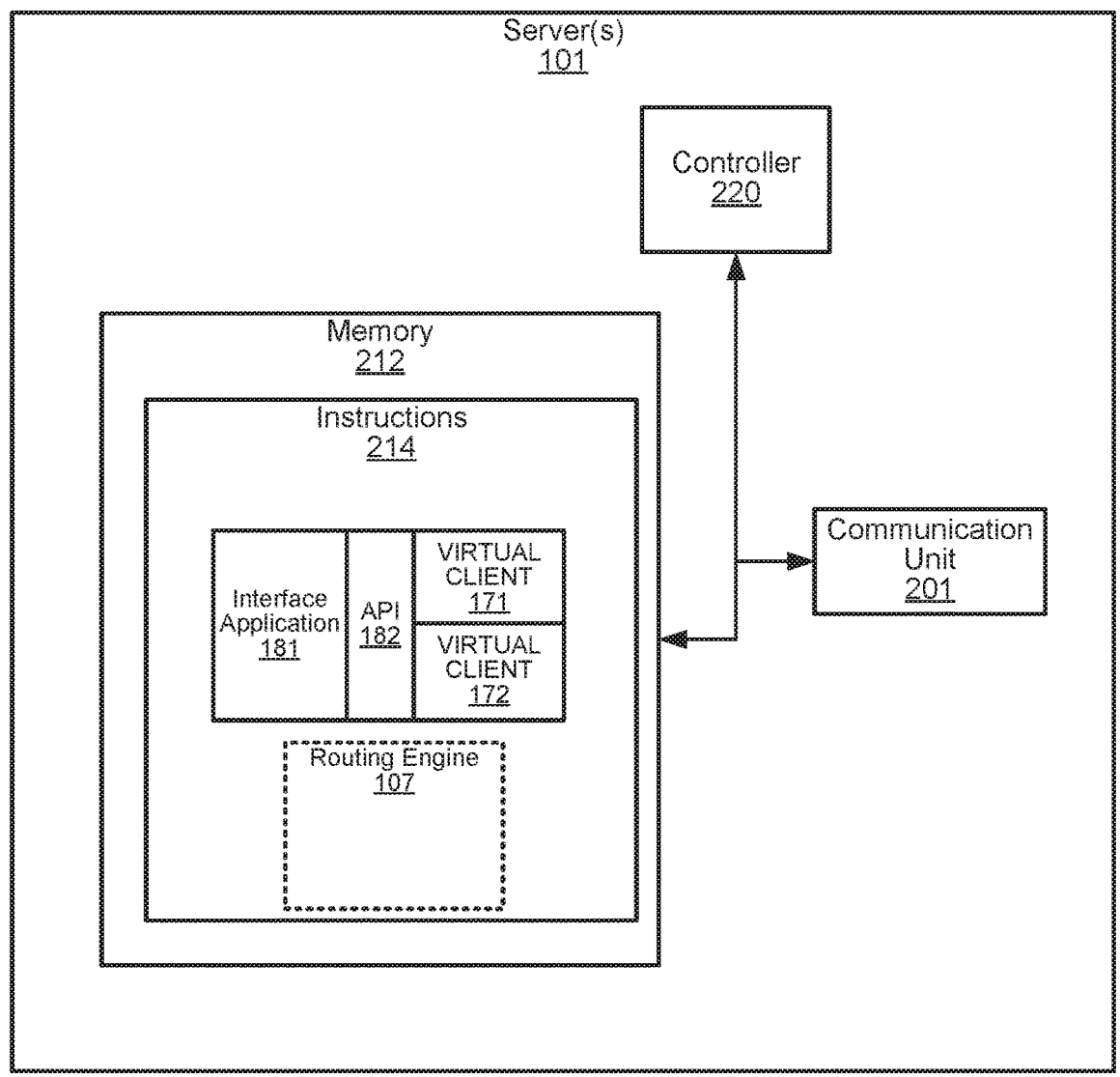
FIG. 2 illustrates a server for implementing communications that include social media clients, in accordance with exemplary embodiments of the specification.

Attention is next directed to FIG. 2 which depicts an example schematic diagram of the server 101. The server 101 may comprise one or more server co-located with the call server 103 and/or one or more cloud-based servers remote from the call server 103.

The server 101 comprises: a communication unit 201 configured to communicate with a social media server and/or a plurality of social media servers (e.g. the social media servers 141, 142); a memory 212 storing instructions 214 including, but not limited to, instructions for operating the virtual clients 171, 172, the interface application 181 and/or the API 182; and a controller 220 communicatively coupled to the other components of the server 101 via a computer bus, and the like.

While not depicted the server 101 may comprise other components including, but not limited to, input devices, display screens, speakers, microphones and/or any suitable combination of input devices and/or output devices.

The communication unit 201 may comprise any suitable wireless and/or wired communication unit including, but not limited to any suitable combination of wireless and/or wired network interfaces for communicating with the call server 103 (when not combined with the server 101) and the social media servers 141, 142. Indeed, the communication unit 201 may be configured to communicate with the call server 103 via the LAN with which the call server 103 is communicating with the communication devices 111, 112, and/or another communication network. For example, when the server 101 and the call server 103 are separate, they may be co-located and/or remote from each other, with the communication unit 201 configured accordingly. In particular, communication unit 201 may be configured to communicate with the call server 103 via a SIP protocol and/or any other suitable protocol.

The memory 212 is coupled to the controller 220 and includes a non-transitory machine-readable storage medium that may be any electronic, magnetic, optical, or other physical storage device. The non-transitory machine-readable storage medium of the memory 212 may include, for example, random access memory (RAM), electrically-erasable programmable read-only memory (EEPROM), flash memory, a storage drive, an optical disc, and the like. The memory 212 may also be encoded with executable instructions to implement the functionality of the server 101, for example to receive and transmit voice calls and/or to operate the hardware of the server 101. In other examples, it is to be appreciated that the memory 212 may be substituted with a cloud-based storage system (e.g. accessible to the controller 220 via a communication network such as the LAN with which the call server 103 used to communicate with the communication devices 111, 112).

The memory 212 may also store an operating system and/or other applications, that is executable by the controller 220 to provide general functionality to the server 101, for example, functionality to support various applications such as a user interface to access various features of the server 101.

The controller 220 may include one or more of a processor, central processing unit (CPU), a microcontroller, a microprocessor, a processing core, a digital signal processor (DSP) a field-programmable gate array (FPGA), an application-specific integrated circuit (ASIC) or similar. The controller 220 and memory 212 may cooperate to execute various instructions such as the instructions 214.

In some examples, the instructions 214 may be executed by the controller 220 to operate the controller 220 in different modes.

In particular, in a first mode, when the controller 220 executes the instructions 214, the controller 220 is configured to: operate a virtual client for communicating with clients of a social media server; receive, via the communication unit 201, a call request associated with a directory number of a call server; the call request to initiate a call associated with the directory number and a given client of the social media server; and conduct, via the communication unit, the call by controlling: the virtual client to communicate with the given client, via the social media server; and the virtual client to communicate with a communication device associated with the directory number, via the call server. Hence, for example, in the first mode, the server 101 is operated to facilitate calls between the communication devices 111, 112 and the social media clients 161, 162.

In a second mode, when the controller 220 executes the instructions 214, the controller 220 is configured to: operate a virtual client for communicating with clients of a social media server; receive, via the communication unit 201, at the virtual client, social media status information of a given client of the social media server, the given client associated with a given directory number of a call server; and transmit, via the communication unit, to the call server, the social media status information to cause the call server to update a call server status associated with the given directory number based on the social media status information of the given client of the social media server. In addition, a call server status associated with the given directory number may be received at the virtual client and transmitted to the given client to update a social media status Hence, for example, in the second mode, the server 101 is operated to update a call server status of the first communication device 111 using social media status information received from the social media client 161 (e.g. both the first communication device 111 and the social media client 161 being associated with the same user 131), and vice versa.

In a third mode, when the controller 220 executes the instructions 214, the controller 220 is configured to: operate a first virtual client for communicating with first clients of a first social media server; operate a second virtual client for communicating with second clients of a second social media server; receive, via the communication unit 201, a call request to initiate a call between a first given client of the first social media server and a second given client of the second social media server; conduct, via the communication unit 201, the call between the first given client and the second given client by controlling: the first virtual client to communicate with the given first client via the first social media server; the second virtual client to communicate with the given second client via the second social media server; and the first virtual client to communicate with the second virtual client. Hence, for example, in the third mode, the server 101 is operated to facilitate calls between the social media clients 161, 162 which otherwise may not be compatible with each other.

The server 101 may be operated in any suitable combination of one or more of the three modes including, but not limited to, only the first mode, only the second mode, only the third mode, all three modes, or two of the three of the three modes.

Indeed, while details of the call server 103 are not depicted, the call server 103 is understood to have a similar structure as the server 101, but adapted for the functionality of the call server 103.

Similarly, when the server 101 is combined with the call server 103 (e.g. as the server 105), the server 101 may be adapted to include the functionality of the call server 103. For example, as depicted, the instructions 214 may be further to operate the routing engine 107 and/or any other functionality of the call server 103; hence, as depicted the instructions 214 for the routing engine 107 are depicted using dashed lines to indicate that the server 101 operating the routing engine 107 is optional (e.g. when the server 101 and the call server 103 are combined as the server 105).

Figure 3:
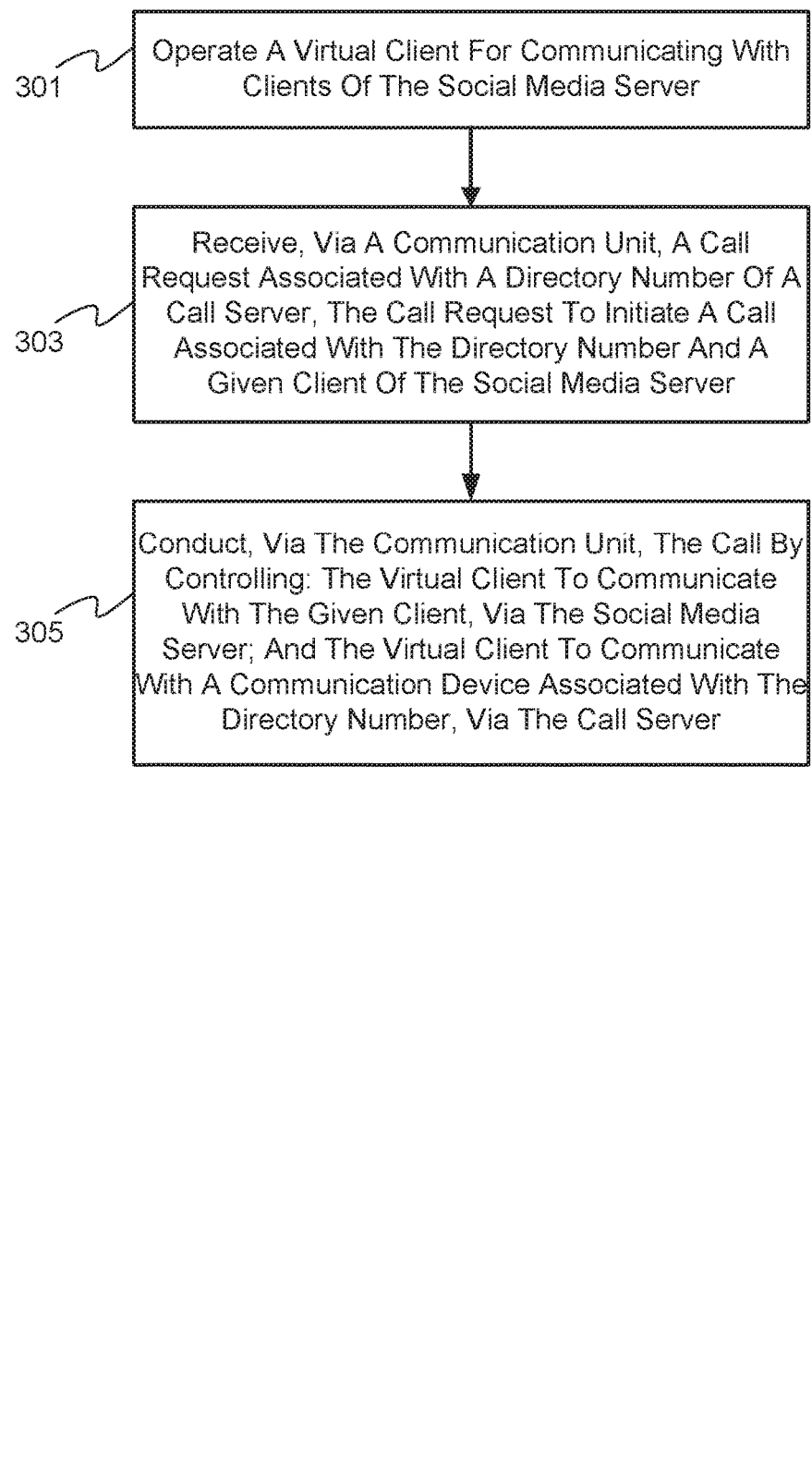
FIG. 3 illustrates a method for implementing communications between a call server and a social media client, in accordance with exemplary embodiments of the specification.

Referring to FIG. 3, a flowchart of a method 300 for implementing communications between a call server and a social media client is depicted. In order to assist in the explanation of method 300, it will be assumed that method 300 may be performed with the server 101 operating in the first mode, and specifically by the controller 220 implementing the instructions 214 in the first mode. Indeed, the method 300 may be one way in which the server 101 provides communications between the call server 103 and a social media client 161 and/or a social media client 162. Furthermore, the following discussion of method 300 may lead to a further understanding of the controller 220, the server 101 and its various components, as well as the system 100. Furthermore, it is to be emphasized, that method 300 may not be performed in the exact sequence as shown, and various blocks may be performed in parallel rather than in sequence, or in a different sequence altogether.

Furthermore, in the example of the method 300 described hereafter, the controller 220 communicates with the social media client 162 via the second virtual client 172 and the second social media server 142 to set up a call between the first communication device 111 and the social media client 162. In other words, in this example, the user 131 "TRISTAN" may use the first communication device 111 to call the user 132 "ZOE" at her social media client 162 (and/or her associated social media account) on her mobile device 152.

However, the controller 220 may alternatively and/or simultaneously implement the method 300 to communicate with the social media client 161 via the first virtual client 171 and the first social media server 141, for example to set up a call between the second communication device 112 and the social media client 161.

However, the controller 220 may alternatively and/or simultaneously implement the method 300 to communicate with the social media client 161 via the first virtual client 171 and the first social media server 141, for example to set up a call between the first communication device 111 and the social media client 161 (e.g. "TRISTAN" or another user, uses the first communication device 111 to call "TRISTAN" at his social media client 161 on his mobile device 151). Similarly, the controller 220 may alternatively and/or simultaneously implement the method 300 to communicate with the social media client 162 via the first virtual client 172 and the second social media server 142, for example to set up a call between the second communication device 112 and the social media client 162 (e.g. "ZOE" or another user, uses the second communication device 112 to call "ZOE" at her social media client 162 on her mobile device 152). For example, a user may wish to operate their desk phone to call their social media client at their mobile phone, and the like, to conference in other social media clients on a call via a social media server.

In yet further examples, the user 132 "ZOE" may operate the second communication device 112 to call the user 131 "TRISTAN" at the first communication device 111; the routing engine 107 may route the call to "TRISTAN" at his social media client 161 on his mobile device 151.

In yet further examples, the controller 220 may alternatively and/or simultaneously implement the method 300 to initiate calls to one or more of the communication devices 111, 112 based on call requests received from one or more of the social media clients 161, 162.

Beginning at a block 301, the controller 220 operates the virtual client 172 for communicating with clients 162 of a social media server 142. As described above, the virtual client 172 may be one of a plurality of virtual clients for communicating with the social media clients of the second social media server 142 including, but not limited to, the social media client 162.

At a block 303, the controller 220 receives, via the communication unit 201, a call request associated with a directory number of the call server 103, such as the directory number 121 associated with the user 131, the call request to initiate a call associated with the directory number 121 and a given client (e.g. the social media client 162) of the second social media server 142. For example, the user 131 may operate the first communication device 111 to call the social media client 162, for example by selecting the social media client 162 from a directory and/or call application in a similar manner as to who the first communication device 111 may be used to select the directory number 122 to call the second communication device 112.

Hence, in some examples, the first communication device 111 is adapted to select social media clients of users to make calls. In some examples, the calling server 103 may maintain a directory of such social media clients for selection by the first communication device 111 (e.g. via a LAN) to place a call thereto.

Indeed, the call server 103 may maintain a directory of various endpoints associated with the user 131 and/or the user 132. For example, the call server 103 may maintain a directory record for the user 131 which includes the directory number 121 and a social media account of the first social media server 141 (and which may include an identifier of social media account of the first social media server 141), as well as any other communication devices associated with the user 131 and/or the directory number 121; similarly, the call server 103 may maintain a directory record for the user 132 which includes the directory number 122 and a social media account of the second social media server 142 (and which may include an identifier of social media account of the second social media server 142), as well as any other communication devices associated with the user 132 and/or the directory number 122.

At a block 305, the controller 220 conducts, via the communication unit 201, the call by controlling: the virtual client 172 to communicate with the given client 162, via the second social media server 142; and the virtual client 172 to communicate with a communication device 111 associated with the directory number 121, via the call server 103.

Hence, voice data and/or audio data and/or video data received at the first communication device 111 (e.g. a microphone thereof and/or a video camera thereof) is transmitted to the virtual client 172 via the call server 103 (e.g. the routing engine 107 may route the voice data and/or audio data and/or video data to the server 101) and translated to a format of the virtual client 172 via the interface application 181 and/or the API 182; the virtual client 172 transmits the voice data and/or audio data and/or video data to the given client 162 via the second social media server 142 where the voice data and/or audio data and/or video data is played at a speaker (and/or a display screen) (and/or a display screen) of the second mobile device 152.

Similarly, voice data and/or audio data and/or video data received at a microphone (and/or a video camera) of the second mobile device 152 operating the given client 162, and is transmitted to the virtual client 172 by the given client 162 via the second social media server 142; the virtual client 172 transmits the voice data and/or audio data and/or video data to the first communication device 111 via the call server 103, with the interface application 181 and/or the API 182 translating the voice data and/or audio data and/or video data to a format of the call server 103. The voice data and/or audio data and/or video data is played at a speaker (and/or a display screen) of the first communication device 111. The routing engine 107 may route the voice data and/or audio data and/or video data to the first communication device 111.

In some examples, prior to conducting the call, the controller 220 may establish an association between the virtual client 172 and the given client 162. For example, some social media servers may require that associations between respective clients and/or respective social media accounts be established before communication therebetween occurs; in some of these examples such establishment between respective clients may be referred to "friending". However, other social media servers do not require that associations between respective clients and/or respective social media accounts be established before communication therebetween occurs: in these examples the call may be conducted without "friending" and/or without establishing an association.

Hence, in these examples, prior to conducting the call, the virtual client 172 may be controlled to transmit, to the given client 162, a request to establish a relationship therebetween, such a request including, but not limited to, a "friend" request. For example, the virtual client 172 may be accessing a respective social media account at the first social media server 141 and the friend request may be between the social media accounts access by each of the given client 162 and the virtual client 172. However, establishing a relationship between the virtual client 172 and the given client 162 may, alternatively, occur in conjunction with establishing the call.

For example, such a request may be transmitted by the virtual client 172 when the call request is received at the block 303; in some of these examples, the given client 162 is controlled to accept the friend request (e.g. the user 132 operates the second mobile device 152 to accept the friend request). Such friending, and the like; may include, but is not limited to an exchange of encryption keys such that the call between the virtual client 172 and the given client 162 may occur in an encrypted manner. Alternatively, when the call is initiated, between the virtual client 172 and the given client 162, such an initiation may include exchange of encryption keys that are deleted once the call is completed.

In some of these examples, once the call is completed the controller 220 may control the virtual client 172 to "unfriend" the given client 162 and/or the associated social media account and/or disestablish the relationship therebetween.

However, in other examples, no association between the virtual client 172 and the given client 162 may be needed for the virtual client 172 and the given client 162 to communicate.

In yet further examples, prior to conducting the call, the controller 220 may associate the virtual client 172 with information associated with the directory number 121, such that the given client 162 identifies the virtual client 172 according to the information associated with the directory number 121. For example, a respective social media account that the virtual client 172 is accessing may be temporarily associated with the directory number 121 may be temporarily "renamed" and/or associated with alphanumeric text such as the numbers of the directory number 121 and/or a name of the user 131 "TRISTAN" and the like, such that the call received at the given client 162 is received with the alphanumeric text. In these examples, when the virtual client 172 is temporarily associated with the information associated with the directory number 121, the controller 220 may be further configured to, after the call ends: disassociate the virtual client 172 and/or the respective social media account, with the information associated with the directory number 121. Hence, the virtual client 172 and/or the respective social media account may be initially generically named (e.g. "VIRTUAL CLIENT 2" and the like), and renamed for the purposed of conducing a call. Once the call ends, the virtual client 172 and/or the respective social media account may again be generically named.

The method 300 may further be applied in different scenarios. For example, as described above: the first communication device 111 associated with the directory number 121 may comprise a communication device associated with the directory number 121 at the call server 103; the call request of the block 303 may comprise a call initiation call request received, via the call server 103, from the first communication device 111; and the call may be conducted, at the block 305, between the first communication device 111 and the given client 162.

However, in another scenario, the call request of the block 303 may comprise a social media call initiation call request received, via the social media server 101, from the given client 162. Hence, for example, the method 300 may also be implemented with the given client 162 calling the first communication device 111.

In yet another scenario, the method 300 may be implemented with a communication device (e.g. associated with a directory number) comprising a calling communication device calling the directory number via the call server 103. In these examples, the second communication device 112 may call the directory number 121 via the call server 103, and hence the second communication device 112 may be referred to as a calling communication device associated with the directory number 111 as the second communication device 112 call the directory number 121. In these examples, the call request of the block 303 comprises a call server call request received from the call server 103 in response to the calling communication device 112 calling the directory number 121 via the call server 103. When the first communication device 111 doesn't answer the call, the routing engine 107 may route the call to the social media client 161 associated with the user 131 (e.g. also associated with the first communication device 111 and/or the directory number 121). However, the routing engine 107 may alternatively route the call to the social media client 161 as part of a personal ring group of the user 131 and/or in a cascade calling scenario, and the like. Regardless, in these examples, the given client 161 of the block 303 may be associated with the user 131 also associated with the directory number 121 being called by the calling communication device 112. The call of the block 305 is then conducted between the calling communication device 112 and the given client 161.

Figure 4:
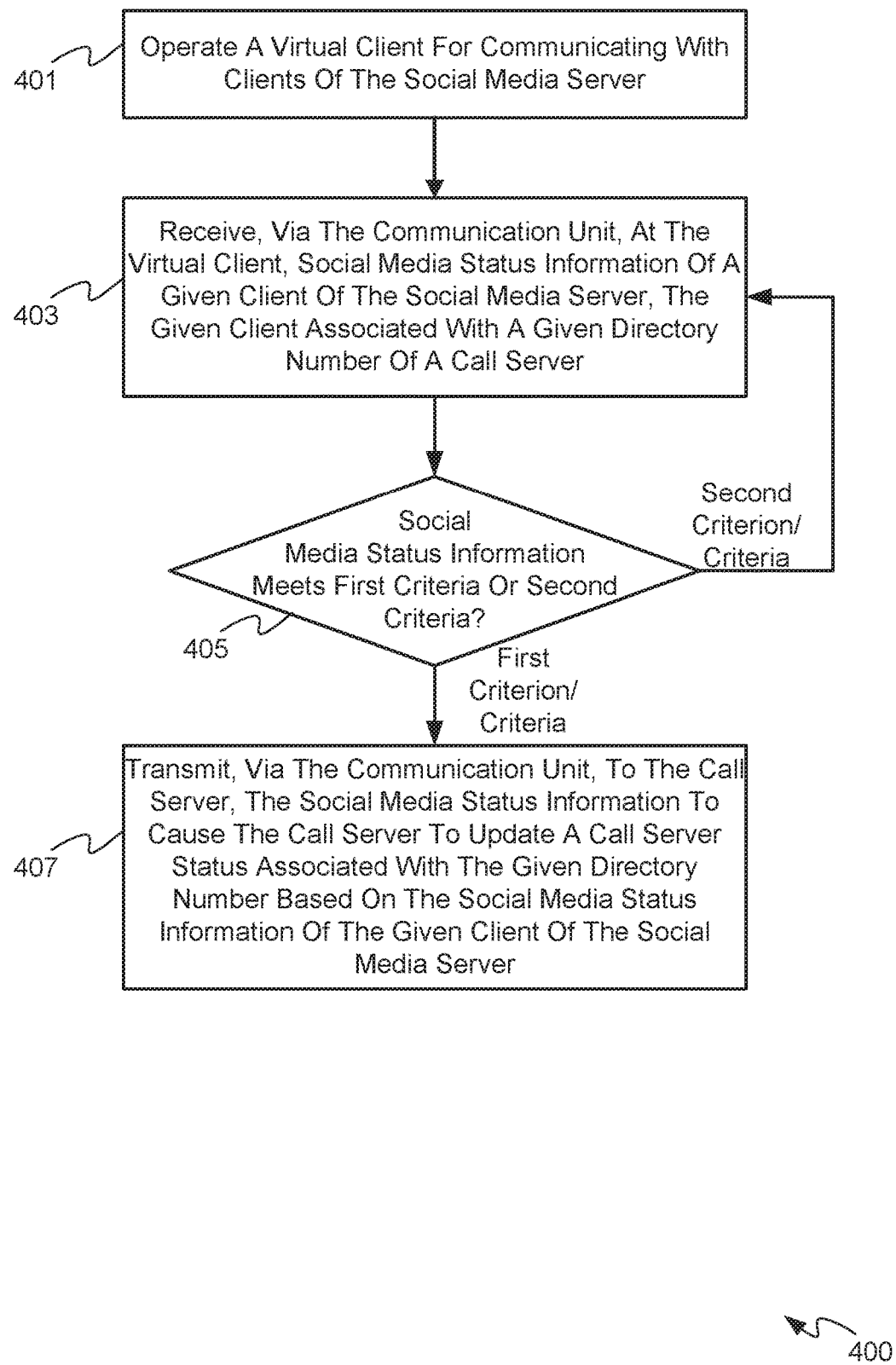
FIG. 4 illustrates a method for updating a call server status with social media status information, in accordance with exemplary embodiments of the specification.

Referring to FIG. 4, a flowchart of a method 400 for updating a call server status with social media status information is depicted. In order to assist in the explanation of method 400, it will be assumed that method 400 may be performed with the server 101 operating in the second mode, and specifically by the controller 220 implementing the instructions 214 in the second mode. Indeed, the method 400 may be one way in which the server 101 provides communications between the call server 103 and a social media client 161 and/or a social media client 162. Furthermore, the following discussion of method 400 may lead to a further understanding of the controller 220, the server 101 and its various components, as well as the system 100. Furthermore, it is to be emphasized, that method 400 may not be performed in the exact sequence as shown, and various blocks may be performed in parallel rather than in sequence, or in a different sequence altogether.

While the method 400 is described with respect to updating a call server status of the user 131 and/or the first communication device 111 using social media status information of the given client 161, in other examples, the method 400 may be implemented to update a call server status of the user 132 and/or the second communication device 112 using social media status information of the given client 162.

At a block 401, the controller 220 operates a virtual client for communicating with clients of the social media server. For example, the controller 220 may operate the virtual client 171 for communicating with clients of the first social media server 141 including the given client 161.

At a block 403, the controller 220 receives, via the communication unit 201, at the virtual client 171, social media status information of the given client 161 of the first social media server 141, the given client 161 associated with a given directory number 121 of the call server 103. For example, the social media status information of the given client 161 may comprise social media status updates which the user 131 "TRISTAN" may post on his social media account associated with the first social media server 141 using the given client 161. For example, the user 131 "TRISTAN" may have registered his social media account with the call server 103 and "friended" the virtual client 171. In some examples, the virtual client 171 be a dedicated virtual client 171 associated with the user 131 "TRISTAN" and/or the directory number 121, alternatively, in other examples, the virtual client 171 may be a virtual client associated with the call server 103 and which receives social media status information from a plurality of given clients 161 associated with different social media accounts of the first social media server 141, each of the different social media accounts also associated, at the call server 103, with different directory numbers; in these examples, the social media status information may be received with information identifying the specific given client 161 (e.g. a name of the user 131, and the like).

At a block 405, which may be optional, the controller 220 may filter the social media status information received at the block 403, for example, by determining whether the social media status information meets first criterion and/or criteria or second criterion and/or criteria. Hereafter first criterion and/or criteria is interchangeably referred to as first criteria, and second criterion and/or criteria is interchangeably referred to as second criteria (e.g. the first criteria and second criteria may be one or more respective criteria). For example the first criteria may include, but is not limited to, a white list of keywords which, when included in the social media status information, the social media status information is transmitted to the call server 103. Similarly, the second criteria may include, but is not limited to, a black list of keywords which, when included in the social media status information, the social media status information is not transmitted to the call server 103. For example, the server 101 may store such a white list and/or black list at the memory 212, and the white list and/or black list may be updated periodically and/or on demand.

In some examples, a white list may be stored, but not a black list. In these examples, the first criteria may comprise the social media status information including a keyword on the white list, while the second criteria may comprise the social media status information not including a keyword on the white list. Conversely, in other examples, a black list may be stored, but not a white list. In these examples, the first criteria may comprise the social media status information not including a keyword on the black list, while the second criteria may comprise the social media status information including a keyword on the black list.

However, any suitable criteria are within the scope of the present specification. In particular, at the block 405, when the updated social media status information meets the second criteria, the controller 220 prevents the updated social media status information from being transmitted to the call server 103, and hence, the controller 220 returns to implementing the block 403 (e.g. to wait for further social media status information from the given client 161). Hence, status updates regarding, for example, sports teams, family, and like, and/or any other status update that may be inappropriate for a business environment, may be prevented from being transmitted to the call server 103.

However, when the updated social media status information meets the first criteria, at the block 405, at a block 407, the controller 220 transmits, via the communication unit 201, to the call server 103, the social media status information to cause the call server 103 to update a call server status associated with the given directory number 121 based on the social media status information of the given client 161 of the social media server. Hence, for example, social media status information indicating that the user 131 "TRISTAN" is on holiday and/or social media status information suitable for a business environment may transmitted to the call server 103 so that the call server 103 may update the call server status of the user 131 and/or the directory number 121 with the social media status information.

In general, the method 400 may be repeated as new and/or updated social media status information of the given client 161 of the first social media server 141 is received. For example, in some examples, the controller 220 may be further configured to: receive, via the communication unit 201, at the virtual client 171, updated social media status information of the given client 161 of the first social media server 141; and transmit, via the communication unit 201, to the call server 103, the updated social media status information to cause the call server 103 to update the call server status associated with the given directory number 121 based on the updated social media status information of the given client 161. Hence, as the user 131 "TRISTAN" updates his social media status, the call server status may also be updated.

However, conversely, in other examples, when the user 131 "TRISTAN" updates his call server status, his social media status may also be updated with this call server status. In these examples, the controller 220 may be further configured to: receive, via the communication unit 201, from the call server 103, an updated call server status associated with the given directory number 121; and transmit, via the communication unit 201, to the given client 161, the updated call server status, to cause the given client 161 to update a social media status based on the updated call server status. The communications between the server 101 and the given client 161 again occur via the virtual client 171.

Figure 5:
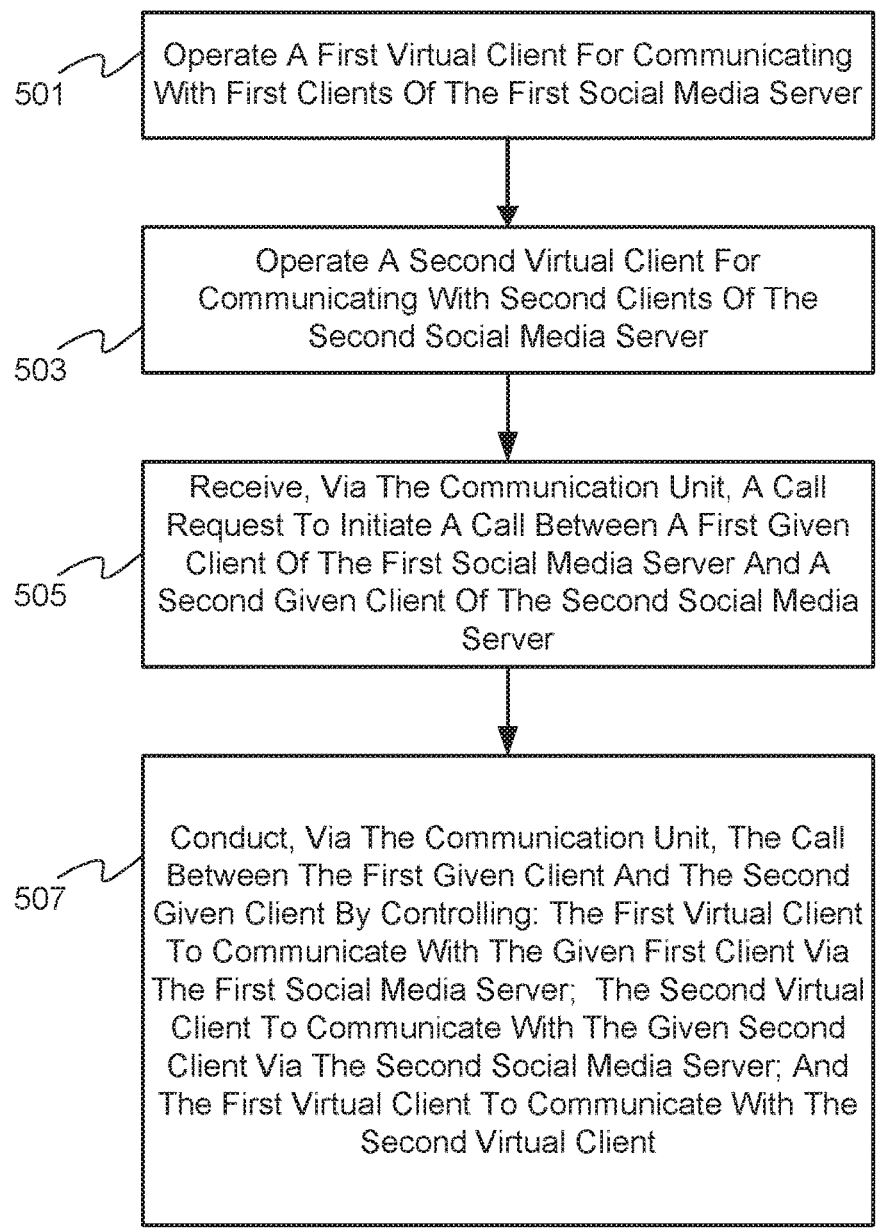
FIG. 5 illustrates a method for implementing communications between different social media clients, in accordance with exemplary embodiments of the specification.

It is further understood that the call server status may be associated with the directory number 121 and may be provided in a directory application that shows status of the users of the call server 103 and/or their associated directory numbers. Hence, for example, the user 131 "TRISTAN" may update his call server status using such a directory application and/or via, the first communication device 111, which may be transmitted to the server 101 for use as a social media status of the given client 161. However, conversely, the user 131 "TRISTAN" may update his social media status suing the given client 161 which may be transmitted to the call server 103 for use as a call server status at such a directory application. Indeed, the call server 103 and/or the server 101 and/or the server 101 may further be configured to determine a priority of a call server status received via the first communication device 111, and the like, and a social media status received via the server 101 from the given client 161. Such a priority may be configurable and/or may be based on any suitable criteria and/or keywords, as described above Referring to FIG. 5, a flowchart of a method 500 for implementing communications between different social media clients is depicted. In order to assist in the explanation of method 500, it will be assumed that method 500 may be performed with the server 101 operating in the third mode, and specifically by the controller 220 implementing the instructions 214 in the third mode. Indeed, the method 500 may be one way in which the server 101 provides communications between the call server 103 and a social media client 161 and/or a social media client 162. Furthermore, the following discussion of method 500 may lead to a further understanding of the controller 220, the server 101 and its various components, as well as the system 100. Furthermore, it is to be emphasized, that method 500 may not be performed in the exact sequence as shown, and various blocks may be performed in parallel rather than in sequence, or in a different sequence altogether.

At a block 501, the controller 220 operates the first virtual client 171 for communicating with first clients of the first social media server 141, as described above.

At a block 503, the controller 220 operates the second virtual client 172 for communicating with second clients of the second social media server 142, as described above.

At a block 505, the controller 220 receives, via the communication unit 201, a call request to initiate a call between the first given client 161 of the first social media server 141 and the second given client 162 of the second social media server 142. The call request may be received from one of: the first given client 161 and the second given client 162. Hence, for example, the first mobile device 151 may be operated to cause the first given client 161 to call the second given client 162 at the second mobile device 152, or vice versa. Indeed, in these examples, the first given client 161 may be adapted to include calling "addresses" and the like for clients not associated with the first social media server 141, and similarly the second given client 162 may be adapted to include calling "addresses" and the like for clients not associated with the second social media server 142. Such addresses may in turn associated, respectively, with the virtual clients 171, 172 and/or associated social media accounts such that the given clients 161, 162 "know" that when such an address is selected, a call to the address may be initiated via a call to a respective social media account of a respective virtual client 171, 172.

At a block 507, the controller conducts, via the communication unit 201, the call between the first given client 161 and the second given client 162 by controlling: the first virtual client 171 to communicate with the given first client 161 via the first social media server 141; the second virtual client 172 to communicate with the second given client 162 via the second social media server 142; and the first virtual client 171 to communicate with the second virtual client 172. Hence, the server 101 generally controls and/or facilitates and/or bridges communications between the first virtual client 171 and the second virtual client 172 to facilitate the call between the given clients 161, 162.

Hence, for example, the controller 220 may control the first virtual client 171 and the second virtual client 172 to communicate with each other via the interface application 181 during the call. In particular, in these examples, the controller 220 may operate the interface application 181 and/or the API 183, either of may be adapted for translating between a first communication format associated with the first social media server 141 and a second communication format associated with the second social media server 142, wherein, during the call, the controller 220 translates between the first communication format and the second communication format using the interface application 181 and/or the API 183.

However, in some examples, the controller 220 may further operate the interface application 181 for translating communications between the call server 103 and one or more of: the first virtual client 171; and the second virtual client 172, for example such that the first communication device 111 and/or the second communication device 112 may also be included on the call between the given clients 161, 162. Put another way, the controller 220 may be configured to include, on the call, via the call server 103, the communication unit 201 and the interface application 181, a communication device 111, and the like.

Indeed, in some examples, the interface application 181 may include: a first application for controlling and/or facilitating calls between the call server 103 and the virtual clients 171, 172; and a second application for translating between the virtual clients 171, 172. The second application for translating between the virtual clients 171, 172 may not include the API 182, however the second application for translating between the virtual clients 171, 172 may include the API 183.

In some examples, as described above, the virtual clients 171, 172 may be dedicated to the users 131, 132 (e.g. via respective social media accounts) and/or the respective given clients 161, 162 while in other examples, the virtual clients 171, 172 may be generic (e.g. also via respective social media accounts) and at least temporarily assigned to the respective given clients 161; 162 for the call.

Either way, the controller 220 may be further configured to one or more of associate the first virtual client 171 with first information (e.g. such as a name of the user 131 "TRISTAN") associated with the first given client 161, such that the second given client 162 identifies the first virtual client 171 according to the first information associated with the first Oven client 161; and, conversely, associate the second virtual client 172 with second information (e.g. such as a name of the user 132 "ZOE") associated with the second given client 162, such that the first given client 161 identifies the second virtual client 172 according to the second information associated with the second given client 162. Hence, a call from the first given client 161 may appear at the second given client 162 as a call from "TRISTAN" and/or a call from the second given client 162 may appear at the first given client 161 as a call from "ZOE".

Furthermore, in some examples, the virtual clients 171, 172 may each be a client associated with the first social media server 141 or the second social media server 142, with the interface application 181 (e.g. a translator application thereof) adapted accordingly. For example, when each of the virtual clients 171, 172 are associated with the second social media server 142, a translator application of the interface application 181 may translate communications between the virtual client 171 and the first social media server 141. Hence, any suitable combination of virtual client types may be used to facilitate communications between the given clients 161, 162 via the server 101.

Figure 6:
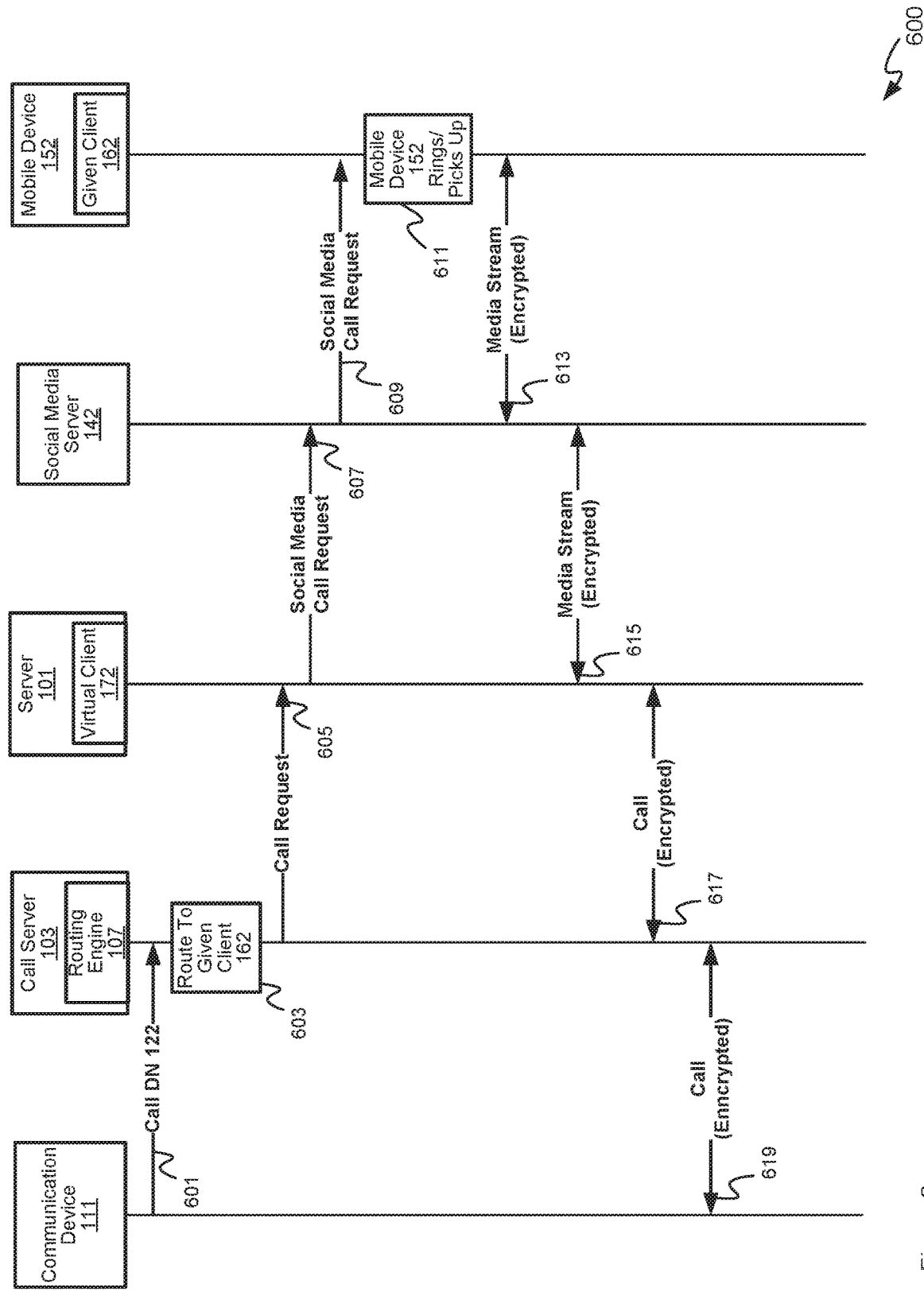
FIG. 6 illustrates an example signal flow diagram showing a method for implementing communications between a call server and a social media client implemented in the components of the system of FIG. 1, in accordance with further exemplary embodiments of the specification.

Attention is next directed to FIG. 6 which depicts an example signal flow diagram 600 showing the method 300 implemented in the components of the system 100. While not all components of the system 100 are depicted, they are nonetheless understood to be present. In particular, the signal flow diagram 600 depicts a call from the first communication device 111 to the given client 162 at the second mobile device 152. For example, the first communication device 111 may initially be calling the second communication device 112 via the directory number 122, but the user 132 may not be at the second communication device 112 to pick up the call. As such, as will be explained hereafter, the call server 103 may route the call from to the given client 162 at the second mobile device 152.

As depicted, the first communication device 111 initiates 601 a call request to the directory 122 via the call server 103. The routing engine 107 at the call server 103 receives the call request from the first communication device 111 and may: first ring the second communication device 112 associated with the directory number 122 and then, when the second communication device 112 does not pick up the call, next ring the given client 162 at the second mobile device 152 (for example which is understood, in this example, to be associated with the directory number 122 at the routing engine 107), as described hereafter. Alternatively the routing engine 107 at the call server 103 receives the call request from the first communication device 111 and may attempt to ring any and/or all devices associated with directory number 122 including the given client 162 at the second mobile device 152, as described hereafter, either simultaneously or in a cascading manner. Regardless, the routing engine may route 603 and transmit 605 the call request to the server 101 and in particular the virtual client 172, for example using SIP signaling, and the like. In some examples, communications between the call server 103 and the server 101 may include the server 101 implementing an enum process to convert a directory number associated with SIP signaling (e.g. the directory number 121 of the first communication device 111) to an Internet Protocol (IP) address.

For example, the routing engine 107 may alter and/or adapt the call request from the first communication device 111 to include an identifier of the given client 162 and/or an associated social media account, such that the server 101 selects the given client 162 to use to communicate with the given client 162 (e.g. identifier of the given client 162 may explicitly and/or inherently identify the social media service and/or the second social media server 142 associated with the given client 162; for example, the identifier may include a social media account identifier associated with the user 132 and/or the directory number 122 as determined via a directory at the call server 103).

The server 101, via the virtual client 172, receives the call request (e.g. at the block 303 of the method 300) and initiates a social media call request to the given client 162. For example, the server 101 transmits 607 a social media call request to the second social media server 142 that includes the identifier of the given client 162, and the second social media server 142 transmits 609 the social media call request to the given client 162, for example, at the second mobile device 152 (and/or any other device used to access the social media account that the given client 162 is accessing).

The Oven client 162 at the second mobile device 152 receiving the social media call request may generally cause the second mobile device 152 to ring 611, and the like, and the like, and the call may be "picked up" and/or answered at the second mobile device 152 in response to the ringing. The given client 162 at the second mobile device 152, in response to the call being picked up and/or answered, initiates a media stream 613 (as depicted an encrypted media stream) between the given client 162 and the second social media server 142, and, similarly, the second social media server 142 initiates a media stream 615 (as depicted an encrypted media stream) between the second social media server 142 and the virtual client 172.

The media stream 615 is decrypted at the virtual client 172, and the virtual client 172 initiates a call 617 to the call server 103, which, as depicted, may be re-encrypted using encryption keys exchanged between the call server 103 and the server 101 (e.g. different from the encryption keys used to communicate between the virtual client 172 and the given client 162).

The call server 103 and/or the routing engine 107 may decrypt the call 617 and set up an encrypted (or unencrypted) call 619 between the call server 103 and/or the routing engine 107 and the first communication device 111 (e.g. when encrypted, a prior exchange of cryptographic keys between the call server 103 and the communication device 111 is understood to have occurred). Hence, to conduct the call (e.g. at the block 305 of the method 300) the first communication device 111 communicates with the given client 162 via four "legs" the call 619, the call 617, the media stream 615 and the media stream 613, with appropriate encryption/decryption occurring at the call server 103, the server 101 and the second mobile device 152.

While the signal flow diagram 600 is described with respect to the first communication device 111 calling the given client 162, in other examples, the given client 162 may call the directory number 121 to call the first communication device 111, with the depicted signaling adapted accordingly.

Figure 7:
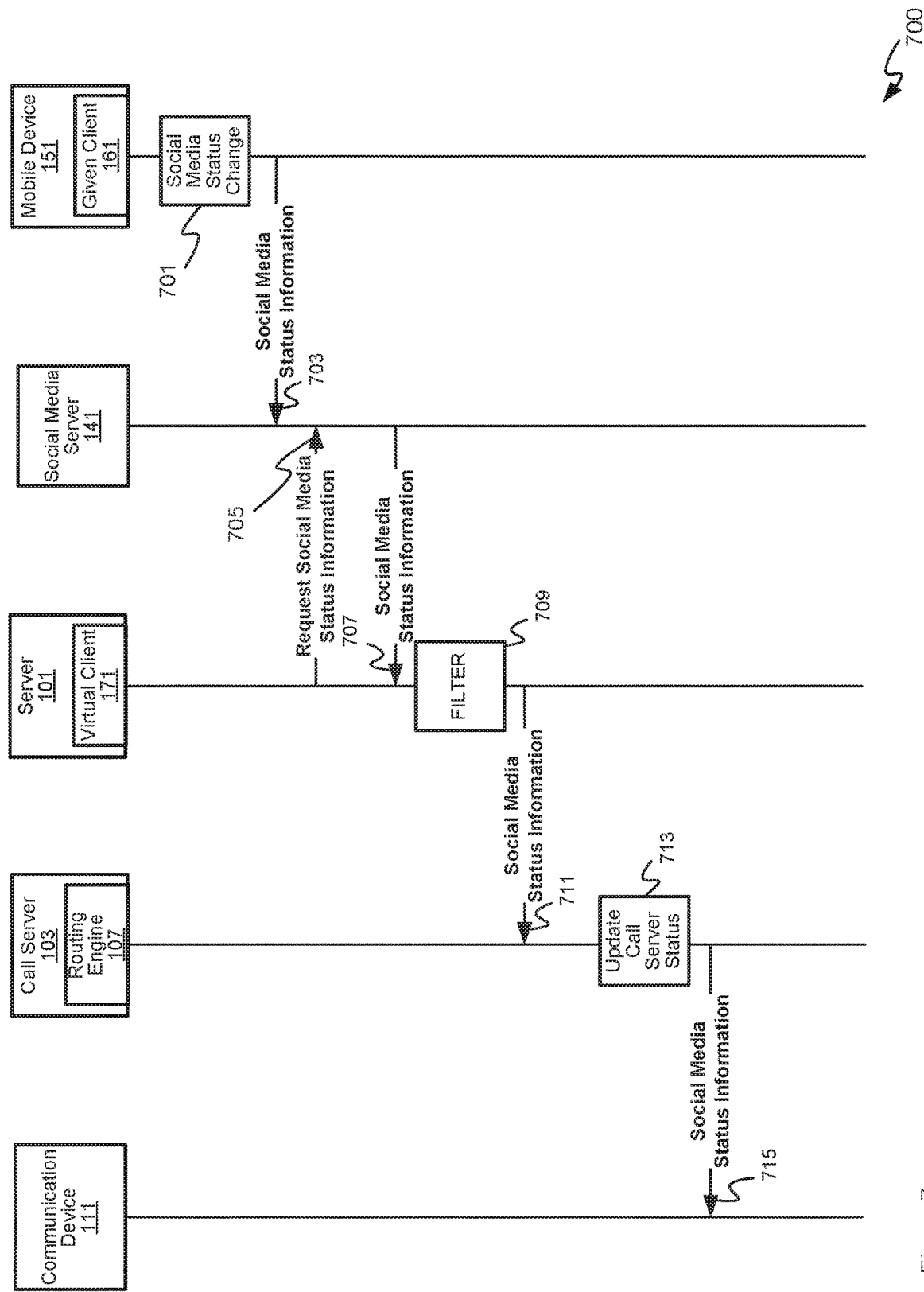
FIG. 7 illustrates an example signal flow diagram showing a method for updating a call server status with social media status information implemented in the components of the system of FIG. 1, in accordance with further exemplary embodiments of the specification.

Attention is next directed to FIG. 7 which depicts an example signal flow diagram 700 showing the method 400 implemented in the components of the system 100. While not all components of the system 100 are depicted, they are nonetheless understood to be present. In particular, the signal flow diagram depicts social media status information of the given client 161 being used to update a call status associated with the directory number 121 at the call server 103. For example, a social media account at the first social media server 141 may be accessed via the given client 161 to update a social media status of the social media account. Furthermore, the social media account accessed by the given client 161 may be associated with the directory number 121 as described above.

As depicted, the given client 161 at the second mobile device 152 is used to update 701 a social media status of an associated social media account. The given client 162 transmits 703 social media status information (e.g. the social media status and the like, and which may include an identifier of the social media account, and the like) to the first social media server 141. The virtual client 171 may periodically request 705 the social media status information from the social media server 103 which responsively which transmits 707 the social media status information to the virtual client 171. Alternatively, the social media server 103 may transmit 707 the social media status information to the virtual client 171 in response to receiving the social media status information (e.g. in a general social media status update to all clients associated with the social media account accessed by the given client 161). Regardless, the virtual client 171 receives (e.g. at the block 403 of the method 400) the social media status information from the first social media server 141.

The virtual client 171 may filter 709 the social media status information as described above (e.g. at the block 405 of the method 400). When the social media status information meets the first criteria, the virtual client 171 (e.g. at the block 407 of the method 400) transmits 711 the social media status information to the call server 103. The call server 103 and/or the routing engine 107 updates 713 a call server status associated with the directory number 121 using the social media status information; for example, the social media status information include the identifier of the social media account which is associated with the directory number 121 at the call server 103 so that the call server 103 and/or the routing engine 107 may identify the directory number 121 from the identifier of the social media account. The call server 103, as depicted, may optionally transmit 715 the social media status information to the first communication device 111 such that a display screen, and the like, of the first communication device 111 may render the social media status information as a call server status of the directory number 121 and/or the user 131.

While the signal flow diagram 700 is described with respect to the call server 103 updating a call server status associated with the directory number 121 using social media status information from the given client 161, in other examples, the call server 103 may transmit call server status associated with the directory number 121 to social media server 141 and/or the given client 162, with the depicted signaling adapted accordingly.

Figure 8:
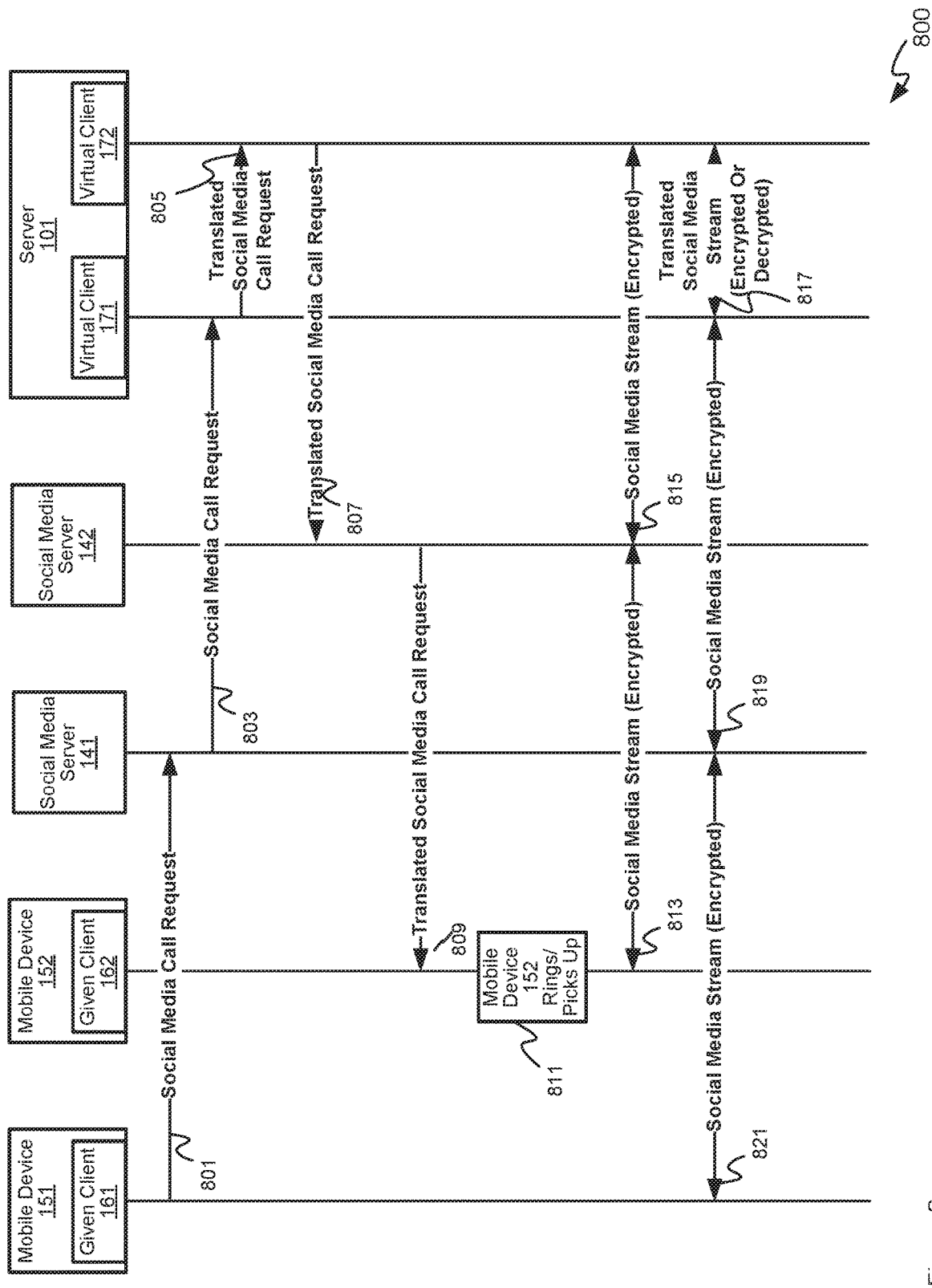
FIG. 8 illustrates an example signal flow diagram showing a method for implementing communications between a call server and a social media client implemented in the components of the system of FIG. 1, in accordance with further exemplary embodiments of the specification.

Attention is next directed to FIG. 8 which depicts an example signal flow diagram 800 showing the method 500 implemented in the components of the system 100. While not all components of the system 100 are depicted, they are nonetheless understood to be present. In particular, the signal flow diagram the given client 161 being used to call the given client 162 via the server 101.

The given client 161 at the first mobile device 151 is operated to transmit 801 a social media call request to the first social media server 141 which transmits 803 the social media call request to the virtual client 171 which receives (e.g. at the block 505 of the method 500) the social media call request. The social media call request may be transmitted with an identifier of a social media account associated with the second social media server 142, which causes the virtual client 171 to transmit 805 the social media call request, for example translated into a format associated with the second social media server 142, to the virtual client 172. The translation may be performed using the interface application 181 and/or a translator application and/or the API 183. The virtual client 172 transmits 807 the translated social media call request to the second social media server 142, which transmits 809 the translated social media call request to the given client 162 at the second mobile device 152 (and/or any other device accessing an associated social media account at the second social media server 142).

The given client 162 at the second mobile device 152 receiving the translated social media call request may generally cause the second mobile device 152 to ring 811, and the like, and the call may be "picked up" and/or answered at the second mobile device 152 in response to the ringing. The given client 162 at the second mobile device 152, in response to the call being picked up and/or answered, initiates a media stream 813 (as depicted an encrypted media stream) between the given client 162 and the second social media server 142, and, similarly, the second social media server 142 initiates a media stream 815 (as depicted an encrypted media stream) between the second social media server 142 and the virtual client 172.

The media stream 815 is decrypted at the virtual client 172, and a translated media stream is 817 is initiated between the virtual clients 171, 172, which could be encrypted or decrypted (e.g. when encrypted, a prior exchange of cryptographic keys between the virtual clients 171, 172 is understood to have occurred). The virtual client 171 may initiate a media stream 819 with the first social media server 141, and similarly the first social media server 141 may initiate a social media stream 821 with the given client 161.

Hence, the given clients 161, 162 communicate via the five media streams 813, 815, 817, 819, 821, with the media stream 817 being used to translated between formats of the social media servers 141 142.

While the signal flow diagram 800 is described with respect to the given client 161 initiating a call with the given client 162, in other examples, the given client 162 may initiate a call with the given client 161, with the depicted signaling adapted accordingly.

Furthermore, in other examples, the signal flow diagram 800 may be combined with the signal flow diagram 600 to further include the first communication device 111 on the call between the given clients 161, 162.

The devices, systems and methods generally described in this specification may generally enable calls between communication devices of call servers and social media clients on mobile devices and/or other devices. Furthermore, the devices, systems and methods generally described in this specification may generally enable calls between different types of social media clients. In each instance, a social media gateway call server may be used to bridge and/or facilitate such calls.

The present specification has been described above with reference to a number of exemplary embodiments and examples. It should be appreciated that the particular embodiments shown and described herein are illustrative of the specification and its best mode and are not intended to limit in any way the scope of the specification as set forth in the claims. It will be recognized that changes and modifications may be made to the exemplary embodiments without departing from the scope of the present specification. These and other changes or modifications are intended to be included within the scope of the present specification, as expressed in the following claims.

We claim:

1. A server comprising:
   a communication unit configured to communicate with: a first social media server; and a second social media server;
   a controller communicatively coupled to the communication unit, the controller configured to:
   operate a first virtual client for communicating with first clients of the first social media server;
   operate a second virtual client for communicating with second clients of the second social media server;
   receive, via the communication unit, a call request to initiate a call between a first given client of the first social media server and a second given client of the second social media server;
   conduct, via the communication unit, the call between the first given client and the second given client by controlling:
   the first virtual client to communicate with the given first client via the first social media server;
   the second virtual client to communicate with the given second client via the second social media server; and
   the first virtual client to communicate with the second virtual client.

2. The server of claim 1, wherein the controller is further configured to: operate an interface application for translating between a first communication format associated with the first social media server and a second communication format associated with the second social media server, wherein, during the call, the controller translates between the first communication format and the second communication format using the interface application.

3. The server of claim 2, wherein the controller is further configured to: control the first virtual client and the second virtual client to communicate with each other via the interface application during the call.

4. The server of claim 1, wherein the controller is further configured to, prior to conducting the call, one or more of:
   associate the first virtual client with first information associated with the first given client, such that the second given client identifies the first virtual client according to the first information associated with the first given client; and
   associate the second virtual client with second information associated with the second given client, such that the first given client identifies the second virtual client according to the second information associated with the second given client.

5. The server of claim 1, wherein the communication unit is further configured to communicate with a call server, and the controller is further configured to:
   operate an interface application for translating communications between the call server and one or more of: the first virtual client; and the second virtual client; and
   include, on the call, via the call server, the communication unit and the interface application, a communication device.

6. The server of claim 1, wherein the call request is received from one of: the first given client and the second given client.

* * * * *